United States Patent
Gordon

(10) Patent No.: US 7,167,162 B2
(45) Date of Patent: Jan. 23, 2007

(54) APPARATUS AND METHOD FOR CONTROLLING A SCREEN POINTER

(75) Inventor: Gary B. Gordon, Saratoga, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 534 days.

(21) Appl. No.: 10/734,712

(22) Filed: Dec. 12, 2003

(65) Prior Publication Data

US 2005/0128182 A1   Jun. 16, 2005

(51) Int. Cl.
*G09G 5/00* (2006.01)

(52) U.S. Cl. ........................ 345/173; 345/156

(58) Field of Classification Search ............... 345/156, 345/157, 173, 163, 168, 174
See application file for complete search history.

(56) References Cited

U.S. PATENT DOCUMENTS

| | | | |
|---|---|---|---|
| 5,327,161 A * | 7/1994 | Logan et al. ............. 345/157 |
| 5,543,591 A * | 8/1996 | Gillespie et al. ......... 178/18.03 |
| 5,578,813 A | 11/1996 | Allen et al. |
| 5,644,139 A | 7/1997 | Allen et al. |
| 5,786,804 A | 7/1998 | Gordon |
| 5,825,352 A | 10/1998 | Bisset et al. |
| 5,994,710 A | 11/1999 | Knee et al. |
| 6,057,540 A | 5/2000 | Gordon et al. |
| 6,057,830 A | 5/2000 | Chan et al. |
| 6,151,015 A | 11/2000 | Badyal et al. |
| 6,281,882 B1 | 8/2001 | Gordon |
| 6,323,846 B1 * | 11/2001 | Westerman et al. ......... 345/173 |
| 6,452,683 B1 | 9/2002 | Kinrot et al. |
| 6,473,069 B1 | 10/2002 | Gerpheide |
| 6,507,338 B1 | 1/2003 | Liao et al. |
| 6,621,483 B2 | 9/2003 | Wallace et al. |
| 6,888,536 B2 * | 5/2005 | Westerman et al. ......... 345/173 |
| 2002/0130839 A1 | 9/2002 | Wallace et al. |

FOREIGN PATENT DOCUMENTS

JP           2000194493 A       7/2000

* cited by examiner

*Primary Examiner*—Ricardo Osorio

(57) ABSTRACT

An apparatus for controlling a position of a screen pointer for an electronic device having a display screen includes a touchpad including a touch-sensitive surface on which a pointing object may be placed. The touchpad is configured to generate position signals indicative of positions of the pointing object on the touch-sensitive surface. The apparatus includes a controller for generating a first set of movement data based on the position signals. The first set of movement data is indicative of motion of the pointing object across the touch-sensitive surface. The controller is configured to generate a second set of movement data when the pointing object is removed from the touch-sensitive surface, thereby leaving the touch-sensitive surface free from contact by a pointing object. The second set of movement data is indicative of motion of the pointing object across the touch-sensitive surface prior to removal of the pointing object.

20 Claims, 5 Drawing Sheets

APPARATUS AND METHOD FOR CONTROLLING A SCREEN POINTER

THE FIELD OF THE INVENTION

This invention relates generally to devices for controlling a cursor on a display screen, also known as pointing devices. This invention relates more particularly to a touchpad with inertial properties.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. The mouse pad is typically a closed cell foam rubber pad covered with a suitable fabric. Low friction pads on the bottom surface of the mouse slide easily over the fabric, but the rubber ball does not skid. Rather, the rubber ball rolls over the fabric as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse. The user moves the mouse as necessary to get the displayed pointer to a desired location or position. Once the pointer on the screen points at an object or location of interest, a button on the mouse is activated with the fingers of the hand holding the mouse. The activation serves as an instruction to take some action, the nature of which is defined by software in the computer.

A "track ball" is another example of a mechanical type of pointing device. A track ball is essentially an upside-down mouse. In a track ball, rather than sliding the device itself over a surface to produce pointer movement as in a mouse, a user directly contacts the mechanical ball with the user's finger, and causes the ball to rotate. As with a mouse, the movement of the mechanical ball in a track ball generates a corresponding movement of the displayed pointer.

In a track ball, the mechanical ball can be "flicked" with the finger, and the ball will continue to rotate under its own momentum after the user's finger is removed from the ball. The rotation continues until the user contacts the mechanical ball again, or until frictional forces eventually cause the ball to stop rotating. The inertial properties of a track ball that allow it to continue to generate pointer movement after the user stops contacting the mechanical ball result in good dynamic range. Small hand movements can result in large pointer movements. The inertial properties of a track ball are useful in some applications, such as game applications, where large and quick pointer movements are sometimes desirable. However, trackballs are not typically incorporated into modern laptop computers because such computers are designed to use more planar pointing devices, and the height of a typical trackball makes it incompatible with most laptop computers.

Some mechanical mouse devices may also provide inertial effects like a track ball. A mechanical mouse may be moved quickly over the mouse pad, and then lifted from the pad, allowing the ball to continue to rotate under its own momentum. Some mechanical mouse devices, however, cause the ball to immediately stop movement when the mouse is lifted from the mouse pad.

Conventional touchpads found on many laptop computers do not use a mechanical ball, or other similar moving mechanical element that has inertial properties. Touchpads are essentially writing surfaces that capture the position of a pointing object, such as a finger, pen, or stylus, which is moved across the writing surface. With a touchpad, position information is typically determined by sensing changes in resistance or capacitance. Touchpads are incorporated into many modern laptop computers because, unlike a trackball, touchpads are more planar, and have a size that permits easier incorporation into a laptop computer. Unfortunately, existing touchpads do not have much finesse, and several swipes across the touchpad surface must typically be performed to move the screen pointer to a desired location. It would be desirable in some applications for a touchpad to provide inertial effects, such as that provided by a track ball.

SUMMARY OF THE INVENTION

One form of the present invention provides an apparatus for controlling a position of a screen pointer for an electronic device having a display screen. The apparatus includes a touchpad including a touch-sensitive surface on which a pointing object may be placed. The touchpad is configured to generate position signals indicative of positions of the pointing object on the touch-sensitive surface. The apparatus includes a controller for generating a first set of movement data based on the position signals. The first set of movement data is indicative of motion of the pointing object across the touch-sensitive surface. The controller is configured to generate a second set of movement data when the pointing object is removed from the touch-sensitive surface, thereby leaving the touch-sensitive surface free from contact by a pointing object. The second set of movement data is indicative of motion of the pointing object across the touch-sensitive surface prior to removal of the pointing object.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
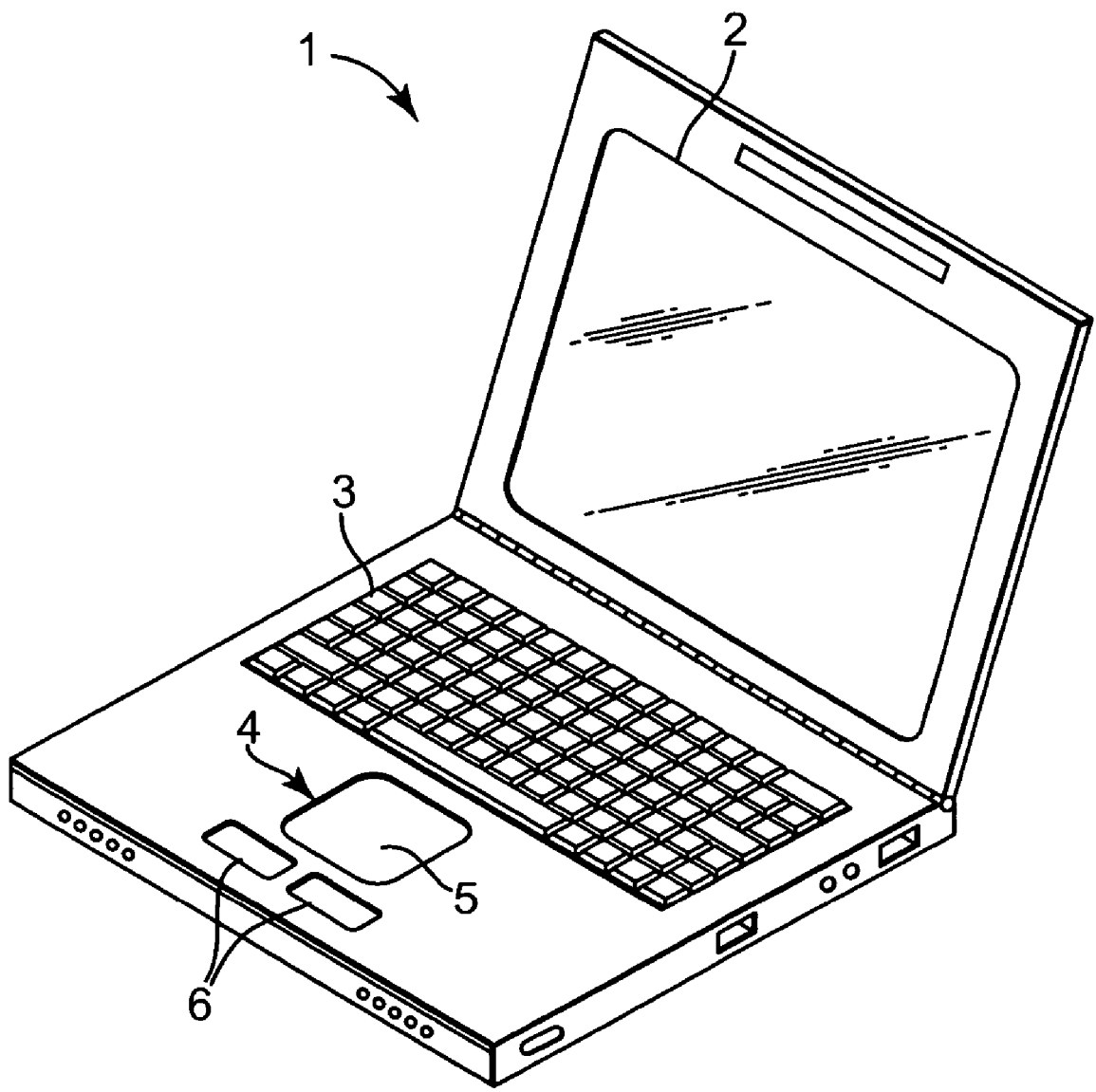
FIG. 1 is a diagram illustrating a laptop computer with a touchpad according to one embodiment of the present invention.

FIG. 1 is a diagram illustrating a laptop computer 1 with a touchpad 4 according to one embodiment of the present invention. Computer 1 includes display 2, keyboard 3, touchpad 4, and buttons 6. Touchpad 4 includes a rectangular-shaped touch-sensitive surface 5. Touchpad 4 is configured to track the movement of a human finger or other pointing object pressed against the surface 5 of the touchpad 4. In one embodiment, touchpad 4 is a resistive type touchpad that identifies the position of a finger pressed against the surface 5 based on sensed changes in resistance. In another embodiment, touchpad 4 is a capacitive type touchpad that identifies the position of a finger pressed against the surface 5 based on sensed changes in capacitance. Computer 1 is described in further detail below with reference to FIG. 2.

Figure 2:
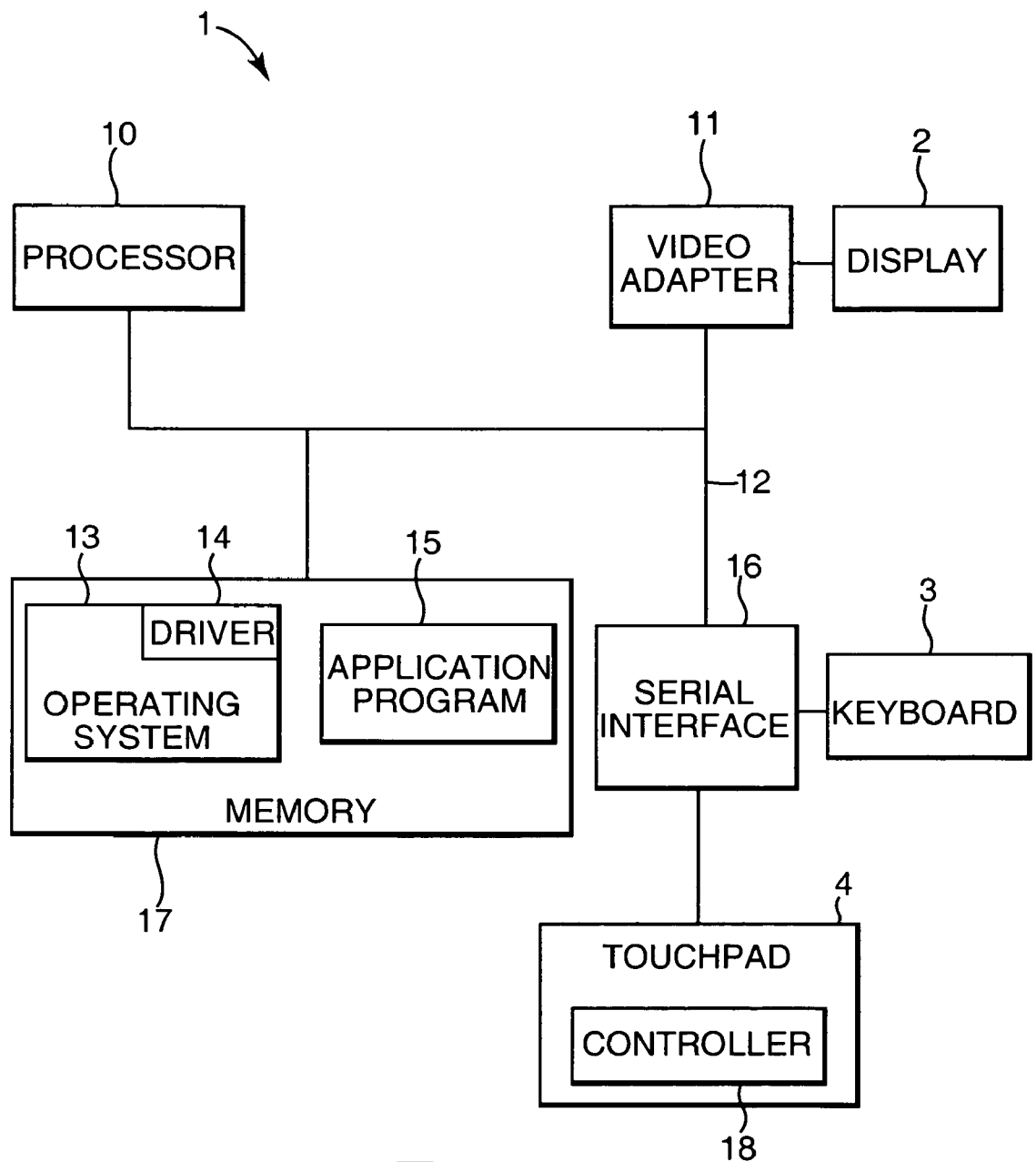
FIG. 2 is a block diagram illustrating major components of the laptop computer shown in FIG. 1 according to one embodiment of the present invention.

FIG. 2 is a block diagram illustrating major components of the laptop computer 1 shown in FIG. 1 according to one embodiment of the present invention. Computer 1 includes processor 10, video adapter 11, display 2, system bus 12, memory 17, serial interface 16, keyboard 3, and touchpad 4.

Processor 10 communicates with various components of computer 1, including video adapter 11, serial interface 16, and memory 17, via system bus 12. Video adapter 11 is coupled to display 2, and drives display 2 under the control of processor 10. Touchpad 4 and keyboard 3 are communicatively coupled to processor 10 via serial interface 16 and system bus 12. Motion data received from touchpad 4 is passed from serial interface 16 to processor 10 for processing. Memory 17 includes operating system 13 and one or more application programs 15. Operating system 13 includes touchpad driver 14, which is used by processor 10 in processing motion data received by touchpad 4.

Although one embodiment of the present invention is described in the context of a laptop computer system, the techniques described herein are applicable to any type of electronic device with a touchpad, including, but not limited to, a cellular telephone, personal digital assistant (PDA), portable music player (e.g., MP3 player), pager, portable game device, or other device.

Touchpad 4 generates electrical signals indicative of positions of a finger or other pointing object against surface 5 of touchpad 4. In one form of the invention, the electrical signals are generated based on sensed changes in impedance (e.g., resistance or capacitance) caused by the touching of surface 5 by a pointing object. In one embodiment, touchpad 4 includes a controller 18 that generates digital ΔX and a ΔY relative motion data based on the electrical signals. In another embodiment, processor 10 generates ΔX and a ΔY relative motion data based on position signals or data generated by touchpad 4. In one form of the invention, the motion data generated by touchpad 4 are provided through serial interface 16 to processor 10. Processor 10 responds to the motion data received from touchpad 4 to change by a ΔX and a ΔY the displayed position of a pointer (cursor) on display 2. A user moves his finger as necessary against surface 5 of touchpad 4 to get the displayed pointer to a desired location or position on display 2. Once the pointer on the display 2 points at an object or location of interest, one of the buttons 6 is activated by the user. The activation serves as an instruction to processor 10 to take some action, the nature of which is defined by software stored in memory 17, such as driver 14 or application program 15. In another embodiment, the activation is provided by tapping on the surface 5 of touchpad 4. Processor 10 monitors the current position of the screen pointer displayed on display 2 to take appropriate action based on the position of the screen pointer when a user activates a button 6 or taps on the surface 5 of touchpad 4.

If a fingertip was previously touching surface 5, but is then lifted away from the surface 5, this condition is detected by touchpad 4, and in one embodiment, the production of incremental (X, Y) signals continues, with gradually decreasing magnitudes. This has the effect of continuing the motion of the screen pointer. In one form of the present invention, the continued motion is similar to the motion of a screen pointer when a mechanical ball of a track ball is "flicked." When the fingertip is subsequently replaced on surface 5, touchpad 4 detects this condition and treats the situation as though a reset had been performed. That is, until there has been new motion subsequent to the new placement of the fingertip on surface 5, the incremental coordinates (X, Y) will have the value (0, 0). Thus, if the screen pointer is moving when the fingertip is replaced on surface 5, the movement stops when touchpad 4 detects the contact. The screen pointer remains at the position where it stopped until touchpad 4 detects new motion of the fingertip on surface 5.

Figure 3:
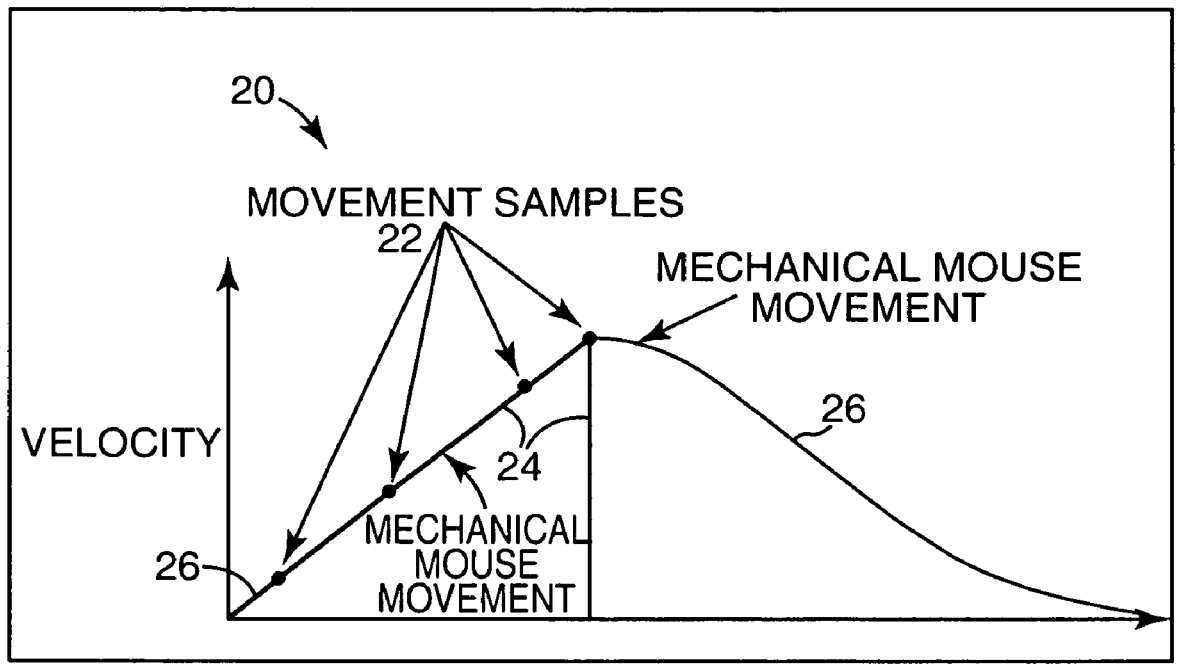
FIG. 3 is a graph illustrating typical velocity profiles for a mechanical pointing device, such as a track ball, and a touchpad.

FIG. 3 is a graph illustrating typical velocity profiles for a mechanical pointing device, such as a track ball, and a touchpad. Graph 20 includes a horizontal axis, a vertical axis, curve 24, and curve 26. The horizontal axis of graph 20 represents time, and the vertical axis represents velocity. Curve 26 illustrates the velocity versus time or velocity profile of a mechanical mouse or track ball when it is "flicked", or quickly accelerated and then released. The total distance moved is proportional to the area under curve 26. Curve 26 is generated from a series of velocity samples 22. As shown by curve 26, the velocity of the mechanical ball in the track ball initially increases at a near constant rate, with the velocity increase caused by a finger beginning a flicking action on the ball. After the mechanical ball is flicked and released, the velocity of the ball gradually decays to zero. In contrast, for a typical touchpad, when a user removes his finger from the touchpad after performing a flicking action, the velocity instantly drops to zero as shown by curve 24. Curves 24 and 26 are representative of typical velocity profiles for one type of pointer device movement, and will vary depending upon the exact movement caused by a user. In one form of the present invention, the velocity profile of a mechanical mouse or track ball represented by curve 26 is used as a model in determining an appropriate velocity profile for a touchpad with inertial properties.

Figure 4:
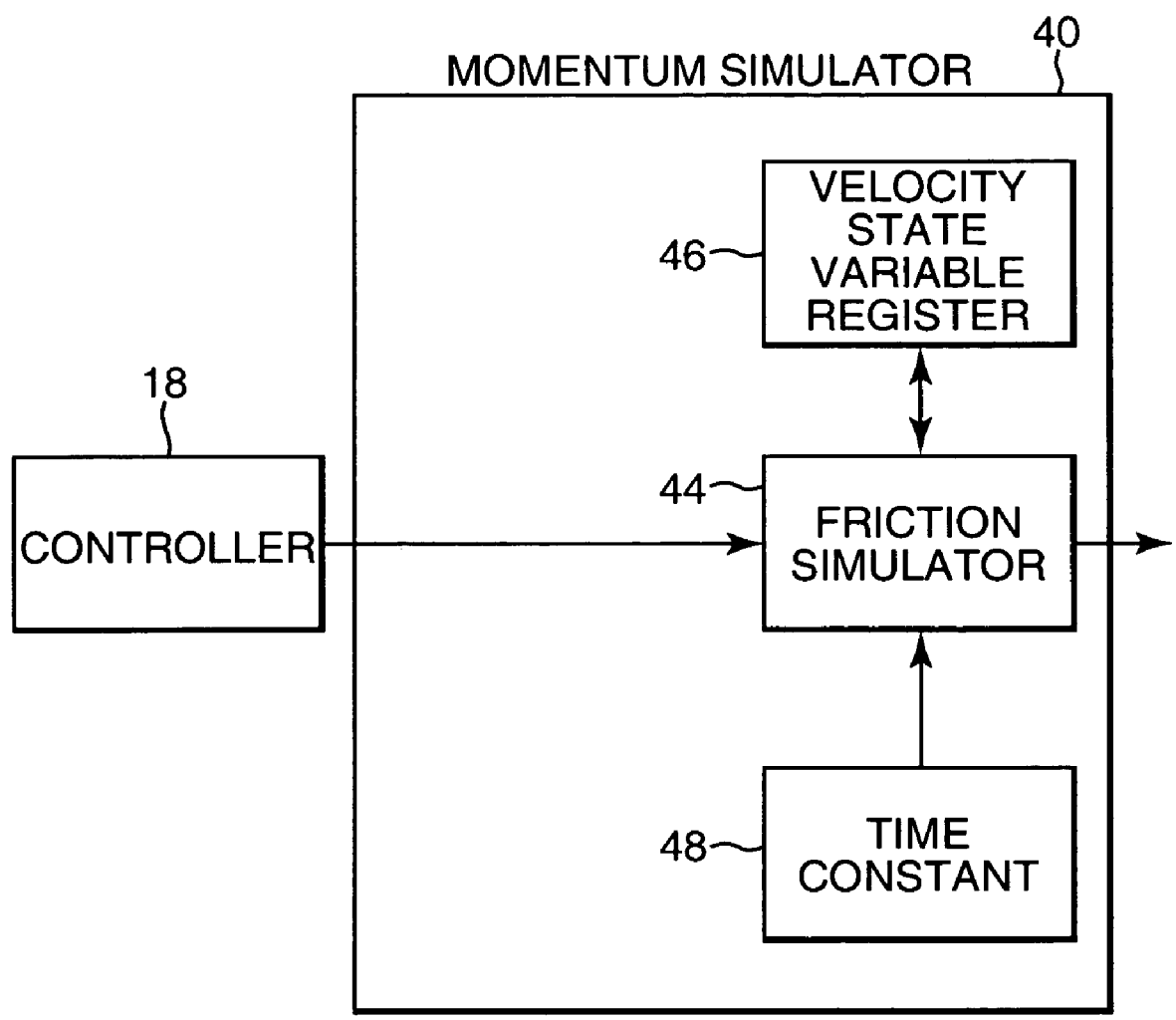
FIG. 4 is a block diagram illustrating one embodiment of a momentum simulator or emulator for a touchpad that provides inertial effects according to one embodiment of the present invention.

FIG. 4 is a block diagram illustrating one embodiment of a momentum simulator or emulator 40 for a touchpad that provides inertial effects according to one embodiment of the present invention. Momentum simulator 40 includes friction simulator or controller 44, velocity state variable register 46, and time constant 48. In one embodiment, momentum simulator 40 and controller 18 are integrated into a single IC package. In another embodiment, momentum simulator 40 and controller 18 are separate ICs. Controller 18 outputs velocity data for X and Y dimensions as discussed above with reference to FIG. 2. In one embodiment, controller 18 multiplies velocity data by a multiplication factor, thereby normalizing the velocity data. The normalized velocity data is output to friction simulator 44, which, in effect, adds friction to the velocity data, and outputs gradually reduced velocity data to processor 10.

In one embodiment, the rate at which the velocity data is reduced by friction simulator 44 is based on an exponential decay with a time constant specified by the value of time constant 48. In one form of the invention, the value of time constant 48 may be specified by a user. Friction simulator 44 stores velocity data in velocity state variable register 46. Momentum simulator 40 is described in further detail below with reference to FIG. 5.

Figure 5:
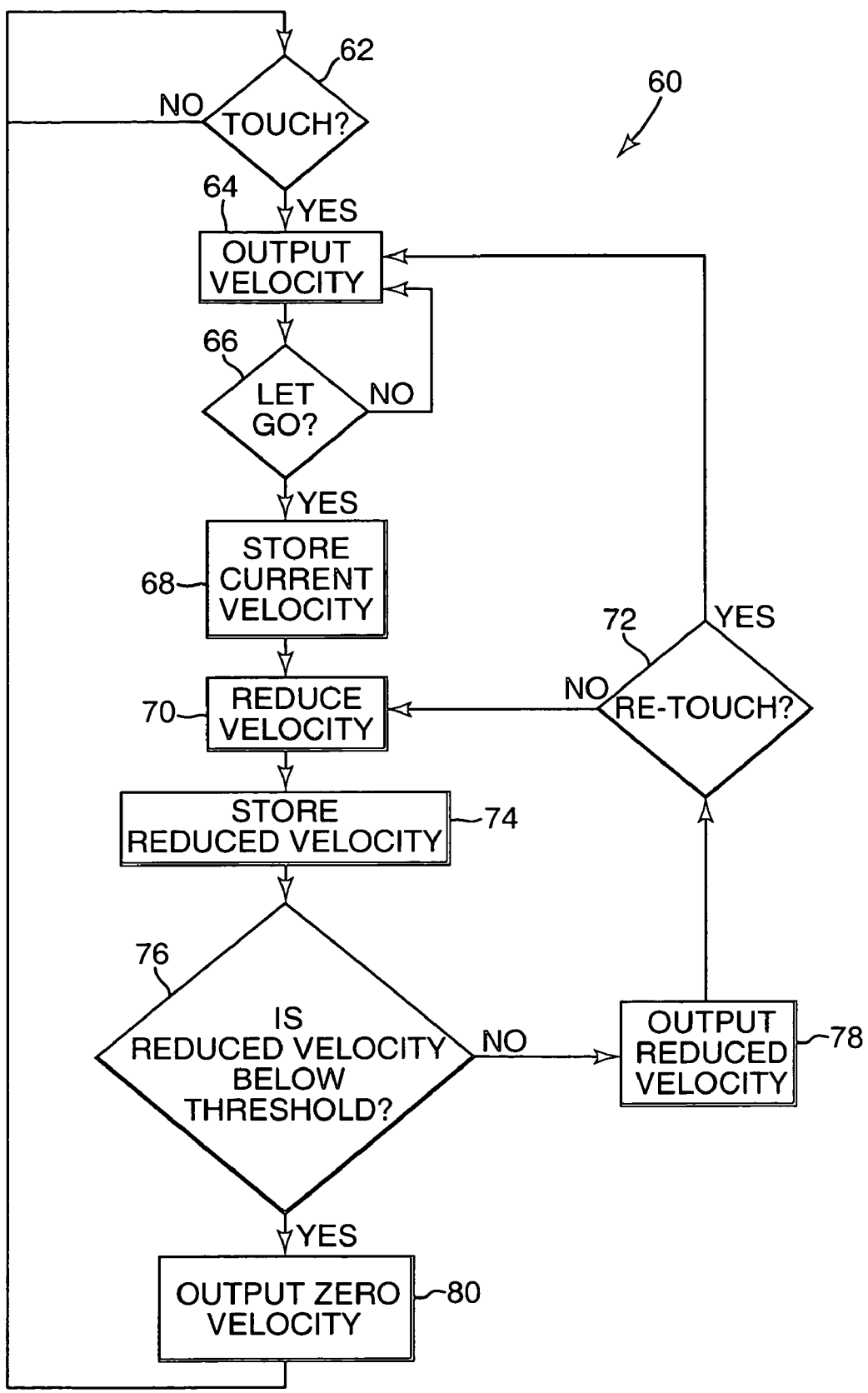
FIG. 5 is a flow diagram illustrating a process for providing inertial effects in a touchpad according to the present invention.

FIG. 5 is a flow diagram illustrating a process 60 for providing inertial effects in a touchpad 4 according to one embodiment of the present invention. In step 62, controller 18 determines whether a fingertip or other pointing object is touching surface 5. If a fingertip is not touching surface 5, controller 18 outputs zero velocity, and continues to sense whether a fingertip touches surface 5. If a fingertip is touching surface 5, controller 18 calculates the X and Y components of the velocity of movement of the fingertip, and, in step 64, outputs the velocity data or movement data to friction simulator 44. In step 66, controller 18 senses whether the fingertip has been removed from surface 5. If the fingertip has not let go of surface 5, controller 18 continues to output velocity data as represented by step 64. Thus, as long as the fingertip continues to move across surface 5, controller 18 continues to output velocity data representative of the movement. The velocity data output by controller 18 is normalized. In one embodiment, controller 18 multiplies the velocity data by 100, and outputs the normalized velocity data to friction simulator 44. Friction simulator 44 outputs the normalized velocity data without adding friction, since the fingertip is still on surface 5.

In step 68, when the fingertip is removed from surface 5, the velocity at the time of removal, or the current velocity data, is stored in register 46. In step 70, friction simulator 44 decreases the velocity data in cycles by an amount determined by time constant 48. In step 74, friction simulator 44 stores the reduced velocity data for the current cycle in register 46. In step 76, friction simulator 44 determines whether the reduced velocity data stored in register 46 is below a specified threshold level. If the reduced velocity data is below the specified threshold level, friction simulator 44 outputs zero velocity in step 80, and controller 18 again waits for the fingertip to touch surface 5 as indicated by step 62. If the reduced velocity data stored in register 46 is not below the specified threshold level, in step 78, friction simulator 44 outputs the reduced velocity data. If the fingertip does not re-touch surface 5 (step 72), friction simulator 44 continues to gradually reduce the velocity data and output the reduced velocity data (steps 70, 74, 76, and 78) until the velocity data is below the specified threshold level. At step 72, if the fingertip re-touches surface 5, the process jumps to step 64, where controller 18 determines the current velocity of movement and outputs corresponding velocity data.

To further illustrate the process 60 according to one embodiment of the present invention, an example will be provided. Assume that the time constant 48 is one second, and that momentum simulator 40 outputs velocity data at 100 samples/second. These values are chosen to simplify the mathematics, and other values may be more appropriate for a commercial device. Assume further that a fingertip has just been removed from surface 5, and that the normalized velocity output by controller 18 at the time of removal is 1.0 inches/second. Friction simulator 44 stores the normalized velocity in register 46. During the first cycle period (i.e., the first millisecond), friction simulator 44 decreases the velocity stored in register 46 by 1 percent, stores the decreased velocity (i.e., 0.9900 inches/second) in register 46, and outputs the decreased velocity. During the second cycle period, friction simulator 44 again decreases the velocity stored in register 46 by 1 percent, stores the decreased velocity (i.e., 0.9801 inches/second) in register 46, and outputs the decreased velocity. Friction simulator 44 continues to decrease the velocity by 1 percent each millisecond until the velocity is below the specified threshold value, at which point friction simulator 44 outputs a value of zero velocity.

For a time constant 48 of 1 second, after the first second, friction simulator 44 drives the initial velocity of 1 inch/second to 0.37 inches/second. After two seconds, friction simulator 44 drives the velocity down to 0.14 inches/second. Assuming that the specified threshold value is 0.10 inches/second, friction simulator 44 drives the initial velocity down to zero just after 2 seconds. Other values for time constant 48 may be chosen to provide a desired level of friction. In addition, acceleration and deceleration characteristics may be explicitly defined by a user. In one embodiment, faster flicks will result in larger initial velocities and longer settling times, and slower flicks will result in smaller initial velocities and shorter settling times. In one embodiment, the inertial motion may be stopped at any time by re-touching surface 5. In one embodiment, the continued inertial movement of the present invention is provided only when a specified minimum acceleration has been provided by a user.

Rather than using a velocity profile based on exponential decay as discussed above, alternative techniques may be used. For example, in one embodiment, a user can graphically enter a sample velocity profile, and a mathematical representation of the entered profile is automatically generated. Friction simulator 44 then uses the mathematical representation to generate the desired velocity characteristics.

In another embodiment, a user can enter a "flick factor", which defines the screen pointer movement when the touchpad 4 is flicked. For example, a 1 inch/second flick of the touchpad 4 could cause the screen pointer to traverse the screen and slide to a stop.

Those of ordinary skill in the art will recognize that there are numerous ways for a user to enter data representing desired pointer movement characteristics. The entered data can then be used by friction simulator 44 to generate the desired response. For example, in one embodiment, a user may specify that the device is to have no friction, so that when the touchpad 4 is flicked, the pointer will continue across the screen until it reaches a screen boundary, or until the user again contacts the touchpad 4. In another embodiment, a user may specify that the touchpad 4 is to provide further acceleration of the screen pointer after a user flicks the touchpad 4. Such further acceleration could not be provided with a simple mechanical track ball, due to the laws of physics. When a track ball has been released, it cannot accelerate further unless pushed by a user. Any mathematical function or arbitrary curve may be entered by a user to specify the desired response of the touchpad 4, including functions or curves that eventually result in zero velocity, and functions and curves that result in continued velocity and/or acceleration after a user stops contacting the touchpad 4. The continued velocity and/or acceleration can be overridden by the user by contacting the touchpad 4. A user may exactly specify the desired characteristics of the touchpad 4 for each particular application.

It will be understood by a person of ordinary skill in the art that functions performed by controller 18 and momentum simulator 40 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

As one example, rather than implementing the inertial properties or other movement characteristics in a sensor or other chip (e.g., momentum simulator 40) as part of touchpad 4, the desired movement characteristics may be implemented in a software driver of a host device (e.g., computer, PDA, digital camera, cell phone, portable game device, etc.) coupled to the touchpad 4.

Embodiments of the present invention provide numerous benefits, including the ability to increase the dynamic range of a touchpad, which is particularly useful for larger screens. Small hand movements can result in large screen pointer movements. Touchpad 4 according to one embodiment provides a large dynamic range similar to a trackball, but with a shallower depth than a typical trackball, thereby making it easier to incorporate touchpad 4 into a laptop computer than a typical trackball. Also, a touchpad 4 like that shown in FIG. 1 can be made to feel and operate just like a mechanical track ball, which may be desirable to individuals who are familiar with operating such mechanical pointing devices.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for controlling a position of a screen pointer for an electronic device having a display screen, the apparatus comprising:
    a touchpad including a touch-sensitive surface on which a pointing object may be placed, the touchpad configured to generate position signals indicative of positions of the pointing object on the touch-sensitive surface; and
    a controller for generating a first set of movement data based on the position signals, the first set of movement data indicative of motion of the pointing object across the touch-sensitive surface, the controller configured to generate a second set of movement data when the pointing object is removed from the touch-sensitive surface, thereby leaving the touch-sensitive surface free from contact by a pointing object, the second set of movement data indicative of motion of the pointing object across the touch-sensitive surface prior to removal of the pointing object, the second set of movement data generated based on predetermined acceleration and deceleration characteristics.

2. The apparatus of claim 1, wherein the second set of movement data is based on an exponential decay.

3. The apparatus of claim 2, wherein characteristics of the exponential decay are user specifiable.

4. The apparatus of claim 2, wherein characteristics of the exponential decay are based on a user specifiable time constant.

5. The apparatus of claim 1, wherein characteristics of the second set of movement data are user definable.

6. The apparatus of claim 5, wherein characteristics of the second set of movement data are defined by a graphical curve provided by a user.

7. The apparatus of claim 5, wherein characteristics of the second set of movement data are defined by a mathematical function provided by a user.

8. The apparatus of claim 1, wherein characteristics of the first set and second set of movement data are user definable.

9. The apparatus of claim 1, wherein the controller is configured to stop generating the second set of movement data when the pointing object is replaced on the touch-sensitive surface.

10. The apparatus of claim 1, wherein the second set of movement data is based on inertial properties of a mechanical screen-pointing device.

11. A method of controlling a position of a screen pointer for an electronic device having a screen display, the method comprising:
    generating position signals indicative of positions of a pointing object placed against a touch-sensitive surface;
    generating a first set of motion data based on the position signals, the first set of motion data indicative of motion in orthogonal axes across the touch-sensitive surface by the pointing object;
    adjusting the position of the screen pointer in accordance with the first set of motion data;
    generating a second set of motion data based on at least a subset of the first set of motion data after the pointing object is removed from the touch-sensitive surface leaving the touch-sensitive surface free from contact by a pointing object, the second set of movement data generated based on predetermined acceleration and deceleration characteristics; and
    adjusting the position of the screen pointer in accordance with the second set of motion data after the pointing object is removed from the touch-sensitive surface.

12. The method of claim 11, wherein the second set of motion data is based on an exponential decay.

13. The method of claim 12, and further comprising:
    receiving motion definition data from a user specifying characteristics of the exponential decay.

14. The method of claim 12, and further comprising:
    receiving time constant data from a user, the time constant data defining characteristics of the exponential decay.

15. The method of claim 11, and further comprising:
    receiving motion definition data from a user specifying characteristics of the second set of motion data.

16. The method of claim 15, wherein the motion definition data is a graphical representation of desired characteristics of the second set of motion data.

17. The method of claim 15, wherein the motion definition data is a mathematical function.

18. The method of claim 11, and further comprising:
    receiving motion definition data from a user specifying characteristics of the first set and second set of motion data.

19. The method of claim 11, and further comprising:
    stopping motion of the screen pointer when the pointing object is replaced on the touch-sensitive surface.

20. A computer-readable medium having computer-executable instructions for performing a method of generating movement data for controlling a position of a screen pointer for an electronic device having a display and a touchpad, the touchpad generating position data indicative of positions of a pointing object on a touch-sensitive surface of the touchpad, comprising:
    identifying when a loss of contact occurs between the pointing object and the touch-sensitive surface;

receiving a flint set of movement data, the first set of movement data indicative of relative movement between the pointing object and the touch-sensitive surface prior to the loss of contact; and generating a second set of movement data based on the first set of movement data when a loss of contact occurs between the pointing object and the touch-sensitive surface, the second set of movement data causing an acceleration of the screen pointer followed by a gradual decrease in a velocity of the screen pointer.

* * * * *

UNITED STATES PATENT AND TRADEMARK OFFICE
CERTIFICATE OF CORRECTION

| | |
|---|---|
| PATENT NO. | : 7,167,162 B2 |
| APPLICATION NO. | : 10/734712 |
| DATED | : January 23, 2007 |
| INVENTOR(S) | : Gary B. Gordon |

It is certified that error appears in the above-identified patent and that said Letters Patent is hereby corrected as shown below:

Column 9, line 1, in claim 20, delete "flint" and insert --first--.

Signed and Sealed this
Twelfth Day of February, 2013

Teresa Stanek Rea
*Acting Director of the United States Patent and Trademark Office*